United States Patent
Huang et al.

(10) Patent No.: US 11,531,463 B2
(45) Date of Patent: Dec. 20, 2022

(54) METHOD FOR DETERMINING TOUCH INSTRUCTION, ELECTRONIC DEVICE AND STORAGE MEDIUM

(71) Applicant: APOLLO INTELLIGENT CONNECTIVITY (BEIJING) TECHNOLOGY CO., LTD., Beijing (CN)

(72) Inventors: Qili Huang, Beijing (CN); Nengjun Ouyang, Beijing (CN); Qing Wang, Beijing (CN)

(73) Assignee: APOLLO INTELLIGENT CONNECTIVITY (BEIJING) TECHNOLOGY CO., LTD.

( * ) Notice: Subject to any disclaimer, the term of this patent is extended or adjusted under 35 U.S.C. 154(b) by 0 days.

(21) Appl. No.: 17/366,723

(22) Filed: Jul. 2, 2021

(65) Prior Publication Data

US 2021/0333963 A1    Oct. 28, 2021

(30) Foreign Application Priority Data

Dec. 18, 2020  (CN) .......................... 202011509209.2

(51) Int. Cl.
*G06F 3/0488* (2022.01)
*B60K 35/00* (2006.01)
*G06F 3/041* (2006.01)

(52) U.S. Cl.
CPC ............ *G06F 3/0488* (2013.01); *B60K 35/00* (2013.01); *G06F 3/0412* (2013.01);
(Continued)

(58) Field of Classification Search
CPC ............ B60K 35/00; B60K 2370/1438; B60K 2370/1472; B60K 2370/577;
(Continued)

(56) References Cited

U.S. PATENT DOCUMENTS

| | | |
|---|---|---|
| 2012/0212420 A1 | 8/2012 | Shin |
| 2013/0339850 A1 | 12/2013 | Hardi et al. |
| 2017/0242580 A1* | 8/2017 | Gdala ..................... G06F 3/167 |

FOREIGN PATENT DOCUMENTS

| | | |
|---|---|---|
| CN | 103365574 A | 10/2013 |
| CN | 104333844 A | 2/2015 |

(Continued)

OTHER PUBLICATIONS

Communication Pursuant to Article 94(3) EPC dated Sep. 13, 2022.

*Primary Examiner* — Yaron Cohen
(74) *Attorney, Agent, or Firm* — Husch Blackwell LLP

(57) ABSTRACT

A method for processing a touch instruction, an electronic device and a storage medium, related to the fields of Internet of Things, intelligent transportation, and the like, are provided. The method includes: detecting a type of a received touch event; in a case where the type of the touch event is a predetermined type, acquiring a number of fingers which execute the touch event of the predetermined type each time; and determining a touch instruction by utilizing a change situation of the number of fingers which execute two adjacent touch events of the predetermined type. According to the solution, the number of fingers which execute the touch event can be determined by utilizing the change situation of the number of fingers corresponding to two adjacent touch events conforming to the predetermined type.

15 Claims, 5 Drawing Sheets

(52) U.S. Cl.
CPC ............... *B60K 2370/1438* (2019.05); *B60K 2370/1472* (2019.05); *B60K 2370/577* (2019.05); *G06F 2203/04104* (2013.01)

(58) Field of Classification Search
CPC .. G06F 3/0416; G06F 3/0412; G06F 3/04883; G06F 3/0488; G06F 2203/04104; G06F 2203/04808
See application file for complete search history.

(56) References Cited

FOREIGN PATENT DOCUMENTS

| | | | |
|---|---|---|---|
| CN | 105849678 | A | 8/2016 |
| CN | 108111750 | A | 6/2018 |
| CN | 108268205 | A | 7/2018 |
| CN | 109032397 | A | 12/2018 |
| EP | 2677405 | A1 | 12/2013 |
| JP | 2014021829 | A | 2/2014 |
| JP | 2015049773 | A | 3/2015 |
| JP | 2020154727 | A | 9/2020 |

\* cited by examiner

METHOD FOR DETERMINING TOUCH INSTRUCTION, ELECTRONIC DEVICE AND STORAGE MEDIUM

CROSS-REFERENCE TO RELATED APPLICATION

This application claims priority to Chinese patent application No. 202011509209.2, filed on Dec. 18, 2020, which is hereby incorporated by reference in its entirety.

TECHNICAL FIELD

The present disclosure relates to the technical field of computers, in particular to the fields of Internet of Things, intelligent transportation and the like.

BACKGROUND

A vehicle machine refers to a short name of a vehicle-mounted information entertainment product installed at a vehicle side, and the vehicle machine is functionally capable of realizing information interconnection between a person and a vehicle, as well as a vehicle and an intelligent terminal such as a mobile phone and the like.

In a scene of information interconnection between a vehicle and an intelligent terminal such as a mobile phone and the like, it includes operations of receiving an instruction by a vehicle machine and transmitting the instruction to the intelligent terminal.

SUMMARY

The present disclosure provides a method and apparatus for processing a touch instruction, a device and a storage medium.

According to one aspect of the present disclosure, there is provided a method for processing a touch instruction, which may include:
 detecting a type of a received touch event;
 in a case where the type of the touch event is a predetermined type, acquiring a number of fingers which execute the touch event of the predetermined type each time; and
 determining a touch instruction by utilizing a change situation of the number of fingers which execute two adjacent touch events of the predetermined type.

According to another aspect of the present disclosure, there is provided an apparatus for processing a touch instruction, which may include:
 a touch event type detection module configured for detecting a type of a received touch event;
 a finger number acquisition module configured for, in a case where the type of the touch event is a predetermined type, acquiring a number of fingers which execute the touch event of the predetermined type each time; and
 a touch instruction determination module configured for determining a touch instruction by utilizing a change situation of the number of fingers which execute two adjacent touch events of the predetermined type.

In a third aspect, an embodiment of the present disclosure provides an electronic device, which may include:
 at least one processor; and
 a memory communicatively connected to the at least one processor, wherein
 the memory stores instructions executable by the at least one processor, the instructions being executed by the at least one processor to enable the at least one processor to perform the method provided by any one of the embodiments of the present disclosure.

In a fourth aspect, an embodiment of the present disclosure provides a non-transitory computer-readable storage medium storing computer instructions for enabling a computer to perform the method provided by any one of the embodiments of the present disclosure.

According to another aspect of the present disclosure, there is provided a computer program product comprising computer instructions which, when executed by a processor, cause the processor to perform the method in any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
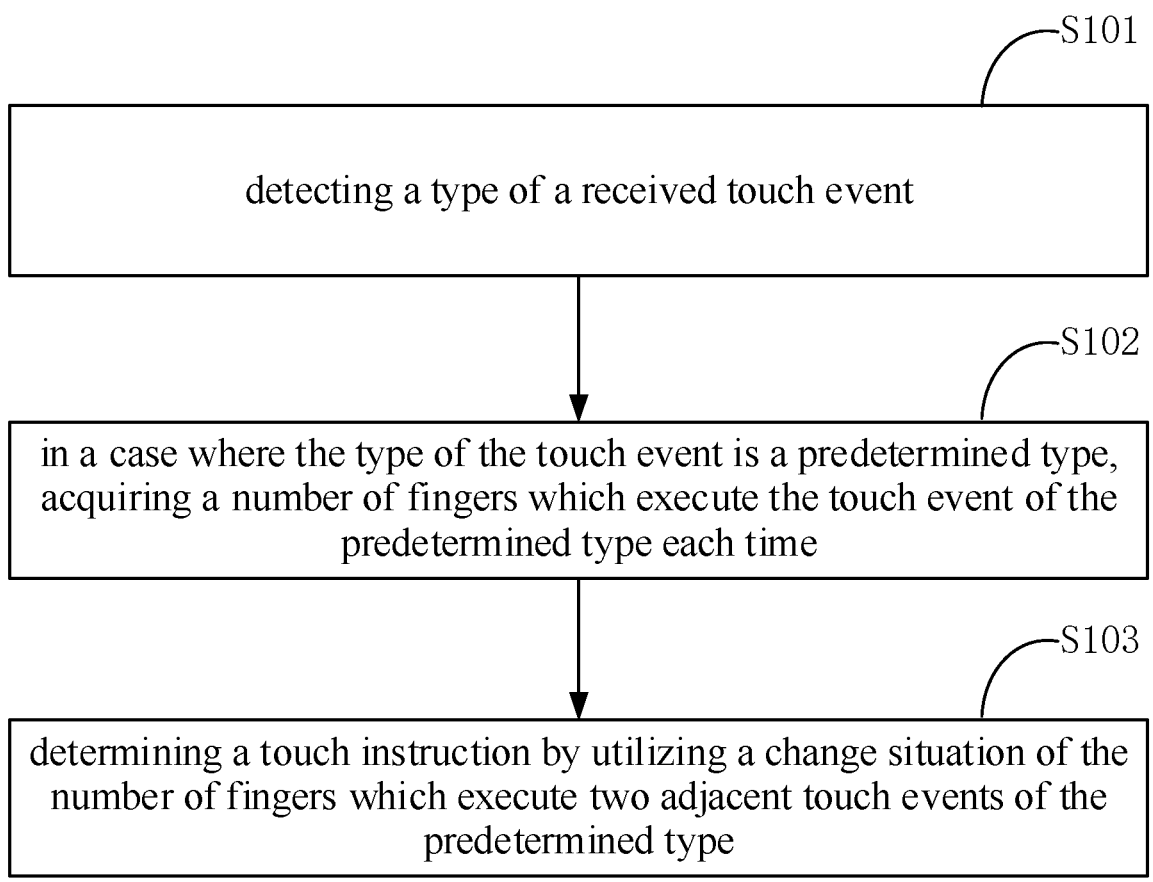
FIG. 1 is a flowchart of a method for processing a touch instruction according to the present disclosure.

As shown in FIG. 1, in one implementation, the present disclosure provides a method for processing a touch instruction, and the method may include:
 S101: detecting a type of a received touch event;
 S102: in a case where the type of the touch event is a predetermined type, acquiring a number of fingers which execute the touch event of the predetermined type each time; and
 S103: determining a touch instruction by utilizing a change situation of the number of fingers which execute two adjacent touch events of the predetermined type.

The number of fingers which execute a touch event can be determined by utilizing the change situation of the number of fingers corresponding to two adjacent touch events conforming to the predetermined type. In a case where the solution is applied to the scene of communication between a vehicle machine and an intelligent terminal, the vehicle machine transmits a control instruction to the intelligent terminal, thus the intelligent terminal can clearly know that the touch instruction is completed by how many fingers, so that the problem of inconsistent information transmission between the vehicle machine and the intelligent terminal in the related art can be solved.

The execution subject of the implementation of the present disclosure may be a vehicle machine. The types of touch events received by the touch screen of the vehicle machine may include at least finger dropping, finger lifting and finger sliding. The finger dropping may correspond to that the touch screen of the vehicle machine detects the touch operation of a finger; the finger lifting may correspond to that the touch screen of the vehicle machine detects a finger leaving the surface of the touch screen; and the finger sliding may correspond to that the touch screen of the vehicle machine detects a finger sliding on the touch screen.

Based on this, the type of the received touch event is detected, and the obtained detection result may at least include finger dropping, finger lifting and finger sliding.

The predetermined type may be finger sliding. That is, in a case where the touch screen of the vehicle machine detects finger sliding, it can be considered that the detection result of the current touch event meets a predetermined condition, that is, the type of the touch event is determined to be the predetermined type. In addition, the predetermined condition may also include detecting that the sliding distance of the finger exceeds a corresponding threshold, detecting that the dwell time of the finger on the touch screen exceeds a corresponding threshold, and the like.

In a case where the detection result meets the predetermined condition, it may be determined that the type of the touch event is the predetermined type. Therefore, the number of fingers corresponding to the touch event conforming to the predetermined condition is acquired. Illustratively, in a case where the operating system of the vehicle machine is an Android system, the detection of the number of fingers may be implemented utilizing a getPointerCount function.

The judgment basis of two adjacent touch events may be determined by detecting the sliding distance of a finger on the touch screen. For example, in a case where the sliding distance of a finger on the touch screen exceeds a corresponding threshold, one touch event may be determined. The ending position of the first touch event may serve as the starting position of the second touch event. Alternatively, it can also be determined by the dwell time of a finger on the touch screen or other manners.

A touch instruction corresponding to a touch event is determined by utilizing the change situation of the number of fingers which execute two adjacent touch events of a predetermined type. For example, in a case where the number of fingers is increased or decreased, the number of fingers performing a touch event currently belonging to a predetermined type may be determined according to the change situation of the number of fingers.

Figure 2:
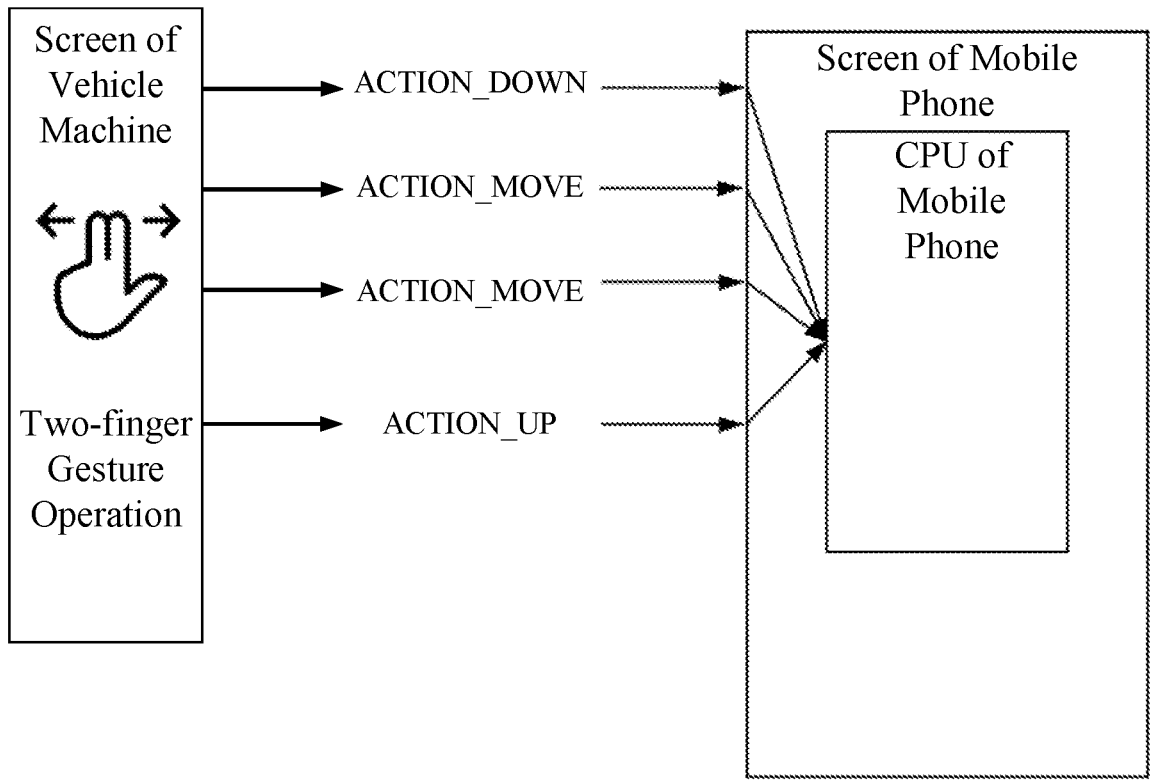
FIG. 2 is a schematic diagram of a vehicle machine being in communication with an intelligent terminal according to the present disclosure.

For example, as shown in combination with FIG. 2, in the related art, the vehicle machine can only detect touch events of finger dropping of a single finger (corresponding to ACTION_DOWN in FIG. 2), finger lifting of a single finger (corresponding to ACTION_UP in FIG. 2) and finger sliding (corresponding to ACTION_MOVE in FIG. 2). However, the vehicle machine cannot detect the dropping of other fingers and the lifting of other fingers.

For the above reasons, even if a user uses a plurality of fingers (taking two fingers as an example in FIG. 2), the vehicle machine can only classify the movements of respective finger as the movement of a single finger. Based on this, in a case where the vehicle machine communicates with an intelligent terminal (corresponding to the CPU of a mobile phone in FIG. 2) to transmit a control instruction, only corresponding information that a control instruction is executed by a single hand will be transmitted. Based on this, the intelligent terminal cannot correctly analyze the control instruction of the user.

However, by adopting the solution of the present disclosure, the number of fingers which execute a touch event can be determined by utilizing the change situation of the number of fingers corresponding to two adjacent touch events conforming to the predetermined type. That is, in a case where a control instruction is transmitted from the vehicle machine to the intelligent terminal, the intelligent terminal can clearly know the number of fingers which execute the touch instruction, and based on this, the recognition precision of the touch instruction can be improved.

Figure 3:
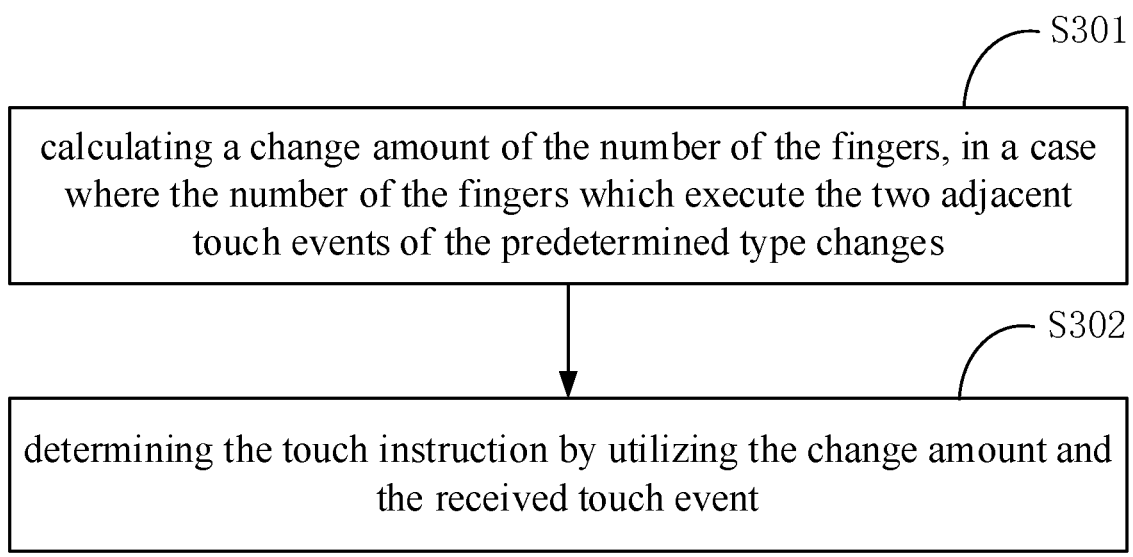
FIG. 3 is a flowchart of determining a touch instruction according to the present disclosure.

As shown in FIG. 3, in one implementation, S103 may specifically include:

S301: calculating a change amount of the number of the fingers, in a case where the number of the fingers which execute the two adjacent touch events of the predetermined type changes; and S302: determining the touch instruction by utilizing the change amount and the received touch event.

For each touch event, the number of fingers which execute this touch event may be recorded. Based on this, the change amount of the number of fingers corresponding to two adjacent touch events conforming to a predetermined type can be determined.

For example, in a case where the getPointerCount function is used to detect that the number of fingers which execute the N-th touch event conforming to the predetermined type is 1 and the number of fingers which execute the (N−1)-th touch event conforming to the predetermined type is 2, the change amount of the number of fingers is reduced by one. Herein, N is a positive integer.

In this case, information that the number of fingers is reduced is generated, which, for example, may be represented as ACTION_POINTER_UP. That is, it indicates that there is a case where one of the fingers is lifted in the touch event conforming to the predetermined type at this time compared to the touch event conforming to the predetermined type at the last time.

Based on this, it may indicate that two adjacent touch events conforming to a predetermined type are executed by a single finger. In this case, the touch instruction corresponding to the touch event is determined by utilizing the change situation of the number of fingers (changing from 2 to 1) and the received touch event. That is, the touch instruction corresponding to the touch event is determined by utilizing the touch trajectory of the single finger.

For another example, in a case where the getPointerCount function is used to detect that the number of fingers for the N-th touch event conforming to the predetermined type is 2 and the number of fingers for the (N−1)-th touch event conforming to the predetermined type is 1, the change amount of the number of fingers is increased by one.

In this case, information that the number of fingers is increased is generated, which, for example, may be represented as ACTION_POINTER_DOWN. That is, it indicates that there is a case where one finger dropping is increased in the touch event conforming to the predetermined type at this time compared to the touch event conforming to the predetermined type at the last time.

Based on this, it can indicate that two adjacent touch events conforming to a predetermined type are executed by two fingers. In this case, the touch instruction corresponding to the touch event is determined by utilizing the change situation of the number of fingers (changing from 1 to 2) and the received touch event. That is, the touch instruction corresponding to the touch event is determined by utilizing the touch trajectories of two fingers.

Through the solution, information that the number of fingers is reduced or information that the number of fingers is increased can be correspondingly generated according to the change amount of the number of fingers corresponding to two adjacent touch events conforming to the predetermined type. Based on this, in a case where the control instruction is subsequently transmitted to the intelligent terminal, the intelligent terminal can be clearly informed of the number of fingers which execute the touch instruction corresponding to the current touch event, so that the intelligent terminal can accurately recognize the intention of the user.

In one implementation, S103 may further include:

determining the touch instruction by utilizing the received touch event, in a case where the number of the fingers which execute the two adjacent touch events of the predetermined type does not change.

In a case where the getPointerCount function is used for detecting that the number of fingers for the N-th touch event conforming to the predetermined type is same as the number of fingers for the (N−1)-th touch event conforming to the predetermined type, it indicates that the number of fingers for the latter touch event of the two adjacent touch events conforming to the predetermined type does not change. Therefore, no information about the number of fingers needs to be additionally generated, and the received touch event may be directly used for determining the touch instruction corresponding to the touch event.

Based on the above operations, in a case where the control instruction is subsequently transmitted to the intelligent terminal, the data volume of information transmission can be saved. On the other hand, since the number of fingers which execute the touch event does not change, the analysis error of the touch event does not exist for the intelligent terminal.

In one implementation, the predetermined type in S102 may include: the touch event including a finger sliding event.

In a case where the touch event includes a finger sliding event, it can be determined that the type of the touch event belongs to a predetermined type.

The problem to be solved by the present disclosure is that a vehicle machine cannot recognize that one of the fingers is lifted in a case where the number of fingers which execute a touch event is more than one; or the vehicle machine cannot recognize the situation that the number of fingers which execute the touch event is changed from one to more than one.

Therefore, in the embodiments of the present disclosure, the above-described deficiencies may be overcome by a manner of detecting the number of fingers which execute a finger sliding event. That is, in a case where a change in the number of fingers corresponding to two adjacent touch events of a predetermined type (including a finger sliding event) is detected, information about other fingers dropping (ACTION_POINTER_DOWN) is generated in a case where the number increases; and information about finger lifting (ACTION_POINTER_UP) is generated in a case where the number decreases.

Through the above solution, the situation that other fingers cannot be detected to lift or drop in the prior art can be overcome by utilizing a manner of generating supplementary information. With the supplementary information, the number of fingers which execute a touch event can be indicated accurately and clearly.

In one implementation, the method for processing a touch instruction may further include: sending the touch instruction to a controlled terminal.

Because the execution subject of the present disclosure is a vehicle machine, the corresponding scene is information interaction between the vehicle machine and an intelligent terminal. Therefore, in a case where a touch instruction is determined, sending the touch instruction to a controlled terminal may be further included, that is, the touch instruction is sent to the intelligent terminal so that the intelligent terminal may analyze and execute the touch instruction.

Figure 4:
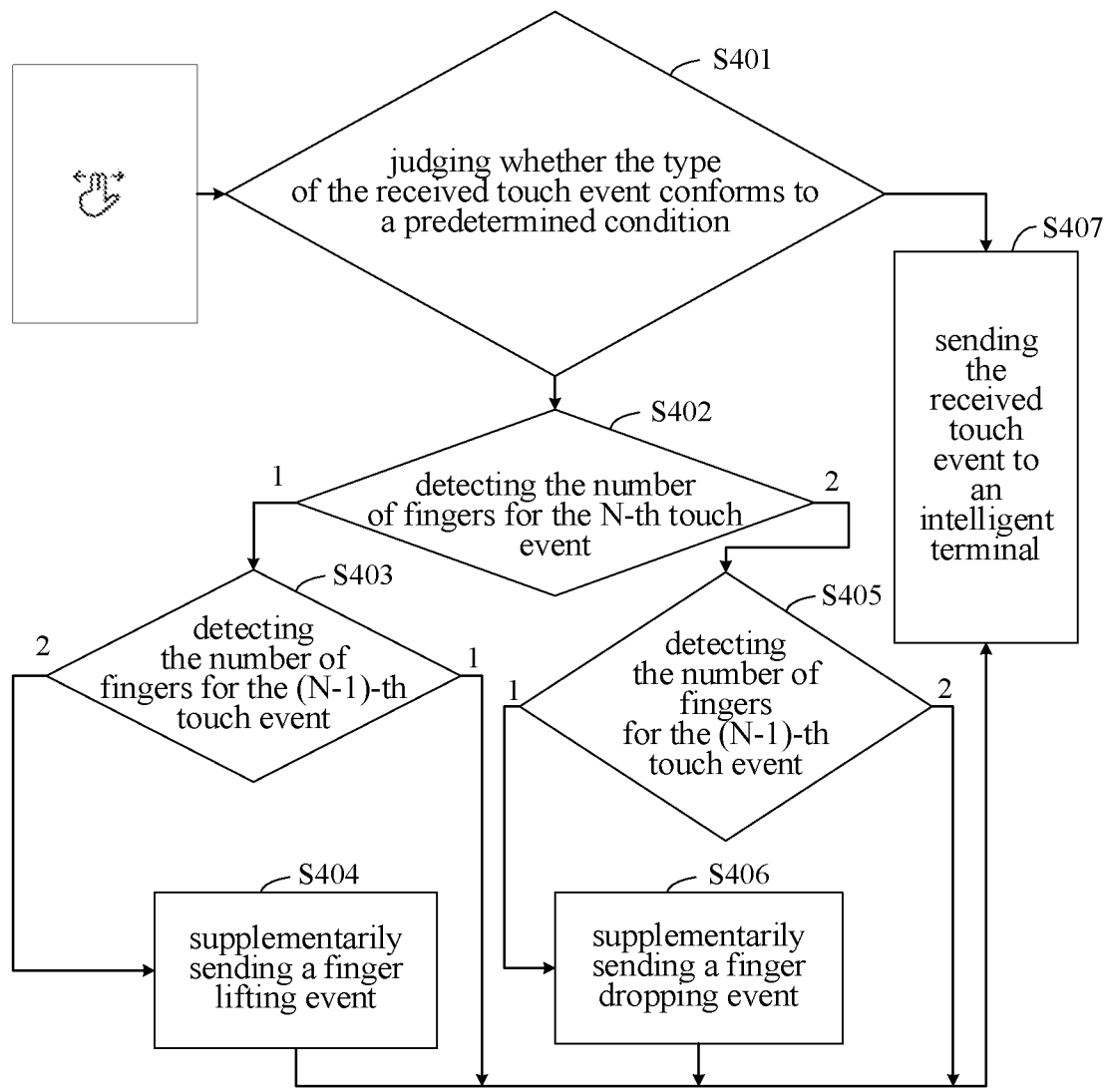
FIG. 4 is a flowchart of a method for processing a touch instruction according to the present disclosure.

As shown in FIG. 4, in one implementation, the present disclosure provides a method for processing a touch instruction, which may include:

S401: judging whether the type of the received touch event conforms to a predetermined condition, and executing S402 in a case where the type of the received touch event conforms to the predetermined condition; otherwise, executing S407.

The predetermined condition may be finger sliding. Taking an Android operating system as an example, in a case where the type of the touch event is detected to be ACTION_MOVE, S402 is executed. On the contrary, in a case where the type of the touch event is detected to be either finger lifting (ACTION_UP) or finger dropping (ACTION_DOWN), S407 is executed.

S402: detecting the number of fingers for the N-th touch event. In a case where the number of fingers for the N-th touch event is 1, S403 is executed; and in a case where the number of fingers for the N-th touch event is 2, S405 is executed.

The present embodiment is described with only a single finger and two fingers as examples, and in the case of a plurality of fingers, the execution principle is same.

S403: detecting the number of fingers for the (N−1)-th touch event. In a case where the number of fingers for the (N−1)-th touch event is 2, S404 is executed; and in a case where the number of fingers for the (N−1)-th touch event is 1, S407 is executed.

S404: supplementarily sending a finger lifting event. After this operation is executed, S407 is executed.

The finger lifting event represents an event that a second finger is lifted, and the finger lifting event may be represented as ACTION_POINTER_UP. That is, it indicates that the number of fingers for the current touch event is changed from 2 to 1 compared to the previous touch event. Therefore, the finger lifting event is supplementarily sent to the intelligent terminal, so that the number of fingers which execute the touch event can be clearly informed to the intelligent terminal.

S405: detecting the number of fingers for the (N−1)-th touch event. When the number of fingers for the (N−1)-th touch event is 1, S406 is executed; in a case where the number of fingers for the (N−1)-th touch event is 2, S407 is executed.

S406: supplementarily sending a finger dropping event. After this operation is executed, S407 is executed.

The finger dropping event represents an event that a second finger is dropped, and the finger dropping event may be represented as ACTION_POINTER_DOWN. That is, it indicates that the number for fingers of the current touch event is changed from 1 to 2 compared to the previous touch event. The finger dropping event is supplementarily sent to the intelligent terminal, so that the number of fingers which execute the touch event can be clearly informed to the intelligent terminal.

S407: sending the received touch event to the intelligent terminal.

In the intelligent terminal side, a touch instruction corresponding to the touch event may be analyzed, and an analysis result may be executed.

The above scene of the embodiment of the present disclosure may be applicable to the interaction of a vehicle machine with an intelligent terminal, such as a Carlife scene and the like. The above example is illustrated with two fingers as an example, and the above solution is equally applicable to a multi-finger scene.

Figure 5:
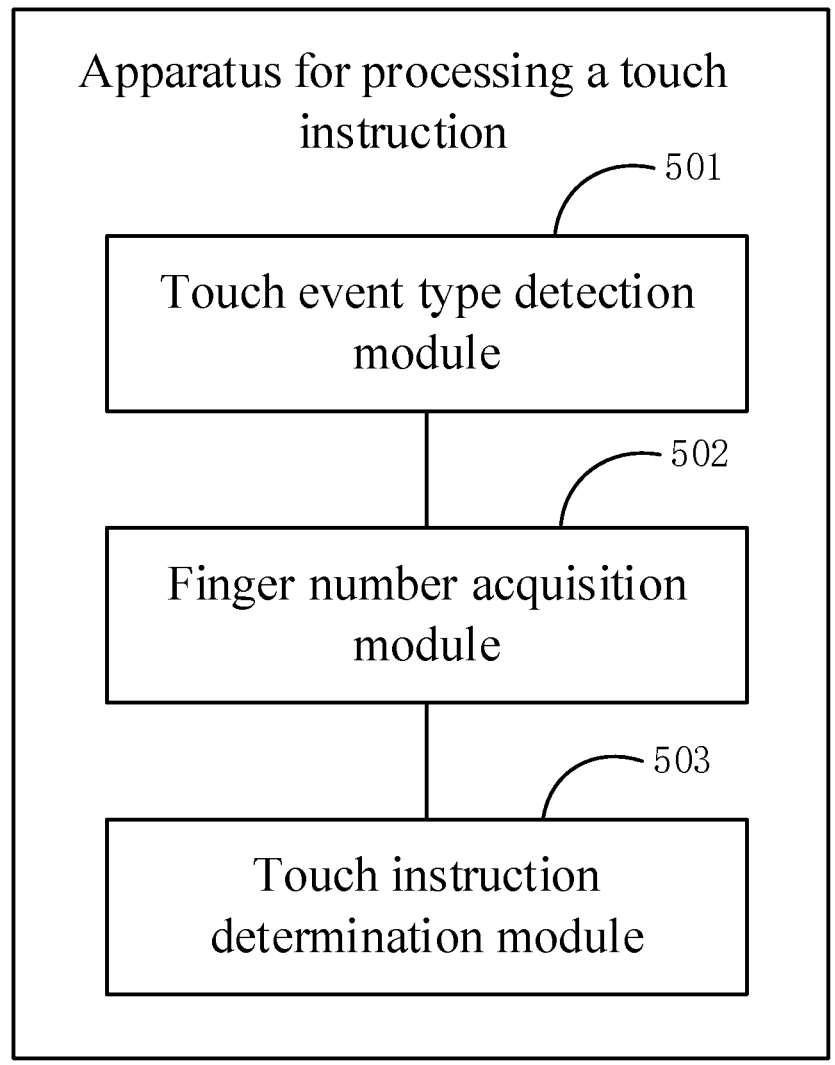
FIG. 5 is a schematic diagram of an apparatus for processing a touch instruction according to the present disclosure.

As shown in FIG. 5, the present disclosure provides an apparatus for processing a touch instruction, and the apparatus may include:

a touch event type detection module 501 configured for detecting a type of a received touch event;

a finger number acquisition module 502 configured for, in a case where the type of the touch event is a predetermined type, acquiring a number of fingers which execute the touch event of the predetermined type each time; and a touch instruction determination module 503 configured for determining a touch instruction by utilizing a change situation of the number of fingers which execute two adjacent touch events of the predetermined type.

In one implementation, the touch instruction determination module 503 may further specifically include:

a finger number change amount calculation submodule configured for calculating a change amount of the number of the fingers, in a case where the number of the fingers which execute the two adjacent touch events of the predetermined type changes; and a touch instruction determination executing submodule configured for determining the touch instruction by utilizing the change amount and the received touch event.

In one implementation, the touch instruction determination module 503 may further be specifically configured for:

determining the touch instruction by utilizing the received touch event, in a case where the number of the fingers which execute the two adjacent touch events of the predetermined type does not change.

In one implementation, the predetermined type may include: the touch event including a finger sliding event.

In one implementation, the apparatus for processing a touch instruction may further include an instruction sending module configured for sending the touch instruction to a controlled terminal.

According to embodiments of the present disclosure, the present disclosure also provides an electronic device and a readable storage medium.

Figure 6:
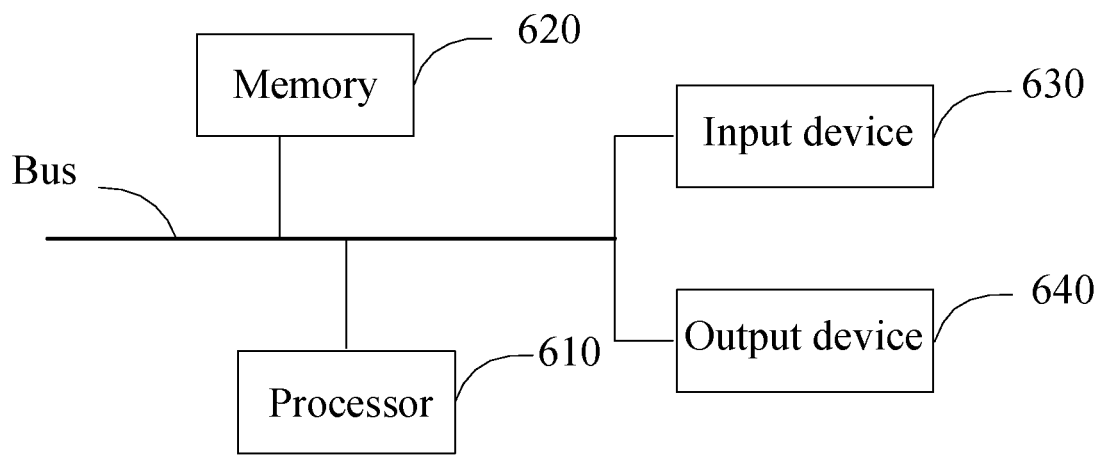
FIG. 6 is a block diagram of an electronic device used to implement the method for processing a touch instruction according to an embodiment of the present disclosure.

FIG. 6 is a block diagram of an electronic device for implementing the method for processing a touch instruction according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 6, the electronic device may include one or more processors 610, a memory 620, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of one processor 610 is shown in FIG. 6.

The memory 620 is a non-transitory computer-readable storage medium provided herein. The memory stores instructions executable by at least one processor to cause the at least one processor to execute the method for processing a touch instruction provided herein. The non-transitory computer-readable storage medium of the present disclosure stores computer instructions for causing a computer to execute the method for processing a touch instruction provided herein.

The memory 620, as a non-transitory computer-readable storage medium, may be configured to store non-transitory software programs, non-transitory computer executable programs and modules, such as program instructions/modules corresponding to the method for processing a touch instruction in the embodiments of the present disclosure (e.g., the touch event type detection module 501, the finger number acquisition module 502 and the touch instruction determination module 503 shown in FIG. 5). The processor 610 executes various functional applications and data processing of an electronic device by running the non-transitory software programs, instructions and modules stored in the memory 620, that is, implements the method for processing a touch instruction in the above method embodiments.

The memory 620 may include a program storage area and a data storage area, wherein the program storage area may store an operating system, and an application program required for at least one function; and the data storage area may store data and the like created according to the use of the electronic device for implementing the method for processing a touch instruction. In addition, the memory 620 may include a high speed random access memory, and may also include a non-transitory memory, such as at least one disk storage device, a flash memory device, or other non-transitory solid state storage devices. In some embodiments, the memory 620 may optionally include a memory remotely located with respect to the processor 610, and these remote memories may be connected, via a network, to the electronic device for implementing the method for processing a touch instruction in the embodiment. Examples of such networks may include, but are not limited to, the Internet, an intranet, a local area network, a mobile communication network and combinations thereof.

The electronic device for implementing the method for processing a touch instruction may further include an input device 630 and an output device 640. The processor 610, the memory 620, the input device 630 and the output device 640 may be connected by a bus or in other ways, and the bus connection is taken as an example in FIG. 6.

The input device 630 may receive input numeric or character information, and generate a key signal input related to a user setting and a function control of the electronic device for implementing the method for processing a touch instruction. For example, the input device may be a touch screen, a keypad, a mouse, a track pad, a touch pad, a pointer stick, one or more mouse buttons, a track ball, a joystick, and other input devices. The output device 640 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN) and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called a cloud computing server or a cloud host, which is a host product in a cloud computing service system, for solving the defects of high management difficulty and weak business extension in the conventional physical host and virtual private server (VPS) service. The server may also be a server of a distributed system, or a server incorporating a blockchain.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-mentioned implementations are not to be construed as limiting the scope of the present disclosure. It will be apparent to those skilled in the art that various modifications, combinations, sub-combinations and substitutions are possible, depending on design requirements and other factors. Any modifications, equivalent substitutions and improvements, and the like within the spirit and principle of the present disclosure are intended to be included within the scope of the present disclosure.

What is claimed is:

1. A method for determining a touch instruction, comprising: detecting a type of a received touch event; in a case where the type of the touch event is a predetermined type, acquiring a number of fingers which execute the touch event of the predetermined type each time; and determining a touch instruction corresponding to two adjacent touch events of the predetermined type by utilizing a change situation of the number of fingers which execute the two adjacent touch events of the predetermined type, wherein a first of the two adjacent touch events of the predetermined type has no effect, and a touch instruction corresponding to a later one of the two adjacent touch events of the predetermined type is used as the touch instruction corresponding to the two adjacent touch events of the predetermined type, in a case where the number of fingers which execute the later one of the two adjacent touch events of the predetermined type is different from the number of fingers which execute a previous one of the two adjacent touch events of the predetermined type.

2. The method of claim 1, wherein the determining the touch instruction by utilizing the change situation of the number of the fingers which execute the two adjacent touch events of the predetermined type, comprises:
    calculating a change amount of the number of the fingers, in a case where the number of the fingers which execute the two adjacent touch events of the predetermined type changes; and determining the touch instruction by utilizing the change amount and the received touch event.

3. The method of claim 1, wherein the determining the touch instruction by utilizing the change situation of the number of the fingers which execute the two adjacent touch events of the predetermined type, comprises:

determining the touch instruction by utilizing the received touch event, in a case where the number of the fingers which execute the two adjacent touch events of the predetermined type does not change.

4. The method of claim 1, wherein the predetermined type comprises: the touch event comprising a finger sliding event.

5. The method of claim 1, further comprising: sending the touch instruction to a controlled terminal.

6. An electronic device, comprising: at least one processor; and a memory communicatively connected to the at least one processor, wherein the memory stores instructions executable by the at least one processor, the instructions being executed by the at least one processor to enable the at least one processor to perform operations of: detecting a type of a received touch event; in a case where the type of the touch event is a predetermined type, acquiring a number of fingers which execute the touch event of the predetermined type each time; and determining a touch instruction corresponding to two adjacent touch events of the predetermined type by utilizing a change situation of the number of fingers which execute the two adjacent touch events of the predetermined type, wherein a first of the two adjacent touch events of the predetermined type has no effect, and a touch instruction corresponding to a later one of the two adjacent touch events of the predetermined type is used as the touch instruction corresponding to the two adjacent touch events of the predetermined type, in a case where the number of fingers which execute the later one of the two adjacent touch events of the predetermined type is different from the number of fingers which execute a previous one of the two adjacent touch events of the predetermined type.

7. The electronic device of claim 6, wherein the determining the touch instruction by utilizing the change situation of the number of the fingers which execute the two adjacent touch events of the predetermined type, comprises:

calculating a change amount of the number of the fingers, in a case where the number of the fingers which execute the two adjacent touch events of the predetermined type changes; and determining the touch instruction by utilizing the change amount and the received touch event.

8. The electronic device of claim 6, wherein the determining the touch instruction by utilizing the change situation of the number of the fingers which execute the two adjacent touch events of the predetermined type, comprises:

determining the touch instruction by utilizing the received touch event, in a case where the number of the fingers which execute the two adjacent touch events of the predetermined type does not change.

9. The electronic device of claim 6, wherein the predetermined type comprises: the touch event comprising a finger sliding event.

10. The electronic device of claim 6, wherein the instructions are executable by the at least one processor to enable the at least one processor to further perform an operation of:

sending the touch instruction to a controlled terminal.

11. A non-transitory computer-readable storage medium storing computer instructions for enabling a computer to perform operations of: detecting a type of a received touch event; in a case where the type of the touch event is a predetermined type, acquiring a number of fingers which execute the touch event of the predetermined type each time; and determining a touch instruction corresponding to two adjacent touch events of the predetermined type by utilizing a change situation of the number of fingers which execute the two adjacent touch events of the predetermined type, wherein a first of the two adjacent touch events of the predetermined type has no effect, and a touch instruction corresponding to a later one of the two adjacent touch events of the predetermined type is used as the touch instruction corresponding to the two adjacent touch events of the predetermined type, in a case where the number of fingers which execute the later one of the two adjacent touch events of the predetermined type is different from the number of fingers which execute a previous one of the two adjacent touch events of the predetermined type.

12. The non-transitory computer-readable storage medium of claim 11, wherein the determining the touch instruction by utilizing the change situation of the number of the fingers which execute the two adjacent touch events of the predetermined type, comprises:

calculating a change amount of the number of the fingers, in a case where the number of the fingers which execute the two adjacent touch events of the predetermined type changes; and determining the touch instruction by utilizing the change amount and the received touch event.

13. The non-transitory computer-readable storage medium of claim 11, wherein the determining the touch instruction by utilizing the change situation of the number of the fingers which execute the two adjacent touch events of the predetermined type, comprises:

determining the touch instruction by utilizing the received touch event, in a case where the number of the fingers which execute the two adjacent touch events of the predetermined type does not change.

14. The non-transitory computer-readable storage medium of claim 11, wherein the predetermined type comprises: the touch event comprising a finger sliding event.

15. The non-transitory computer-readable storage medium of claim 11, wherein the computer instructions are executable by the computer to enable the computer to further perform an operation of:

sending the touch instruction to a controlled terminal.

* * * * *